United States Patent [19]
Allen et al.

[11] Patent Number: 5,834,888
[45] Date of Patent: Nov. 10, 1998

[54] INTERNALLY CHANNELED GLASS ARTICLE AND A LIGHTING DEVICE COMPRISED OF THE SAME

[75] Inventors: Stephen R. Allen, Corning; James G. Anderson, Beaver Dams; Albert M. Gossie; Jackson P. Trentelman, both of Painted Post, all of N.Y.

[73] Assignee: Corning Incorporated, Corning, N.Y.

[21] Appl. No.: 851,320

[22] Filed: May 5, 1997

Related U.S. Application Data

[60] Division of Ser. No. 634,485, Apr. 29, 1996, which is a continuation-in-part of Ser. No. 452,805, May 30, 1995, abandoned.

Provisional application No. 60/012,169, Feb. 23, 1996.

[51] Int. Cl.$^6$ ................................ H01J 63/04; H01J 1/62
[52] U.S. Cl. .......................... 313/484; 313/483; 313/485; 313/489; 313/493
[58] Field of Search ............................ 362/263; 40/545; 313/483, 484, 485, 489, 493, 495

[56] References Cited

U.S. PATENT DOCUMENTS 5,233,262 8/1993 Lynn et al. ................................ 313/493

FOREIGN PATENT DOCUMENTS

| 824251 | 9/1969 | Canada ........................... 313/485 |
| 1275150 | 9/1961 | France ............................ 313/493 |
| 266504 | 1/1950 | Switzerland ..................... 313/485 |
| 660290 | 11/1951 | United Kingdom ............. 313/485 |
| 9202947 | 2/1992 | WIPO .............................. 313/493 |

OTHER PUBLICATIONS

E.B. Shand, Glass Engineering Handbook, p. 278, 1958.

Robert Perry et al., Perry's Chemical Engineers' Hanbook, pp. 23–52, 6$^{th}$ Ed.

*Primary Examiner*—Stanley S. Silverman
*Assistant Examiner*—Michael P. Colaianni
*Attorney, Agent, or Firm*—Christopher A. Gallo; Angela N. Nwaneri

[57] ABSTRACT

The present invention is directed towards a lightweight, sealant-free, thin glass envelope having a front surface and back surface laminated and integrated together, i e. specifically, a unitary envelope body having at least one discharge or ionizable gas channel. The glass envelope exhibits a weight to area ratio of $\leq 1.0$ g/cm$^2$. Lightweight, internally channeled light-emitting devices can be formed from these thin glass envelopes by etching electrodes to the envelope, at opposite ends of, and in communication with, the gas channel which contains a discharge or ionizable gas.

17 Claims, 9 Drawing Sheets

INTERNALLY CHANNELED GLASS ARTICLE AND A LIGHTING DEVICE COMPRISED OF THE SAME

This application is a division of application Ser. No. 08/634,485 filed Apr. 29, 1996, which is a continuation-in-part of application Ser. No. 08/452,805, filed on May 30, 1995 by Allen et al, now abandoned and this application also claims the benefit of U.S. Provisional Application No. 60/012,169 filed on Feb. 23, 1996 by Allen et al.

FIELD OF THE INVENTION

The present invention relates generally to glass articles and forming, and particularly to glass envelopes and the method for forming glass envelopes, i.e., glass articles possessing enclosed internal channels for use in light emitting neon display devices.

BACKGROUND OF THE INVENTION

Neon lighting devices are disclosed in U.S. Pat. No. 4,584,501 (Cocks et al.), U.S. Pat. No. 4,990,826 (Cocks et al.), U.S. Pat. No. 5,036,243 (Cocks et al.). Generally, these patents disclose multifaceted lighting devices comprising glass or other vitreous plates which are hermetically sealed together to form a device with internal and enclosed channels. These enclosed and internal channels are thereafter evacuated and backfilled with an inert gas such as neon which is thereafter ionized through the provision of a series of electrodes.

Generally, the method for forming the glass component of these prior art neon lighting device involved cutting channels in a bottom glass plate followed by hermetically sealing, via the use of a glass frit, another -lass top plate to this channeled glass bottom plate. Various methods were used to cut the channels into the bottom glass plate including grinding, etching and sand blasting through an adhesive rubberized mask exhibiting a pattern identical in shape to the desired channel pattern. The result of this cutting and subsequent fritting was that formation of the glass component of these lighting devices was an expensive and inefficient process and the resultant glass component was too heavy for use in those applications where weight was a concern, e.g., automotive applications.

Other more recent flat type lighting devices are disclosed in U.S. Pat. Nos. 5,041,762 (Hartai), 5,220,249 (Tsulcada) and 5,223,262 (Lynn at.). However, each of these references produces the glass body in generally the same manner; two glass plates fritted or sealed together. For example, Tsukada discloses a pair of transparent plates assembled and sealed together by a solder glass with a groove formed on the surface of one of the transparent glass plates thereby forming a discharge channel.

The principal objective of the present method is to provide for an improved method of forming the glass component for use in neon lighting devices; one which is simpler, more efficient and less costly than the prior art cutting or forming and fritting method, and which produces lightweight, sealant-free glass envelopes In other words, the present method provides for a high volume, low cost method of producing lightweight glass articles possessing enclosed internal channels for use in light-emitting devices.

SUMMARY OF THE INVENTION

Briefly, the present invention for forming glass articles containing internal enclosed channels comprises the following steps: (a) delivering a first or channel-forming ribbon of molten glass to a surface of a mold assembly having a mold cavity possessing at least one channel-forming groove formed therewithin and a peripheral surface, wherein the channel-forming ribbon overlies the mold cavity and the peripheral surface of the mold assembly; (b) causing the channel-forming ribbon of molten glass to substantially conform to the contour of the mold cavity resulting in the formation of at least one channel in the ribbon of the molten glass; (c) delivering and depositing a second or sealing ribbon of molten glass to the outer surface of the channel-forming ribbon of molten glass wherein the viscosity of the sealing ribbon is such that the sealing ribbon bridges but does not sag into contact with the surface of the channel of the channel-forming ribbon but is still molten enough to form a hermetic seal wherever the sealing ribbon contacts the channel-forming ribbon, thereby resulting in a glass article possessing at least one enclosed channel; and, (d) removing the glass article from the mold.

Conformance of the channel-forming molten glass ribbon to the mold cavity may be achieved by gravity forces, vacuum actuation or by a combination of both.

The discovery of this method has enabled the production of lightweight, sealant-free, thin glass envelopes having a front surface and back surface laminated and integrated together, i.e., a unitary envelope body having at least one discharge or ionizable gas channel. Specifically, glass envelopes can be produced which exhibit a weight to area ratio of $\leq 1.0$ g/cm$^2$. Lightweight, internally channeled light-emitting devices can be formed from these thin glass envelopes; in this application electrodes are attached to the envelope, at opposite ends of, and in communication with, the gas discharge channel containing a discharge or ionizable gas.

DETAILED DESCRIPTION OF THE INVENTION

Figure 1:
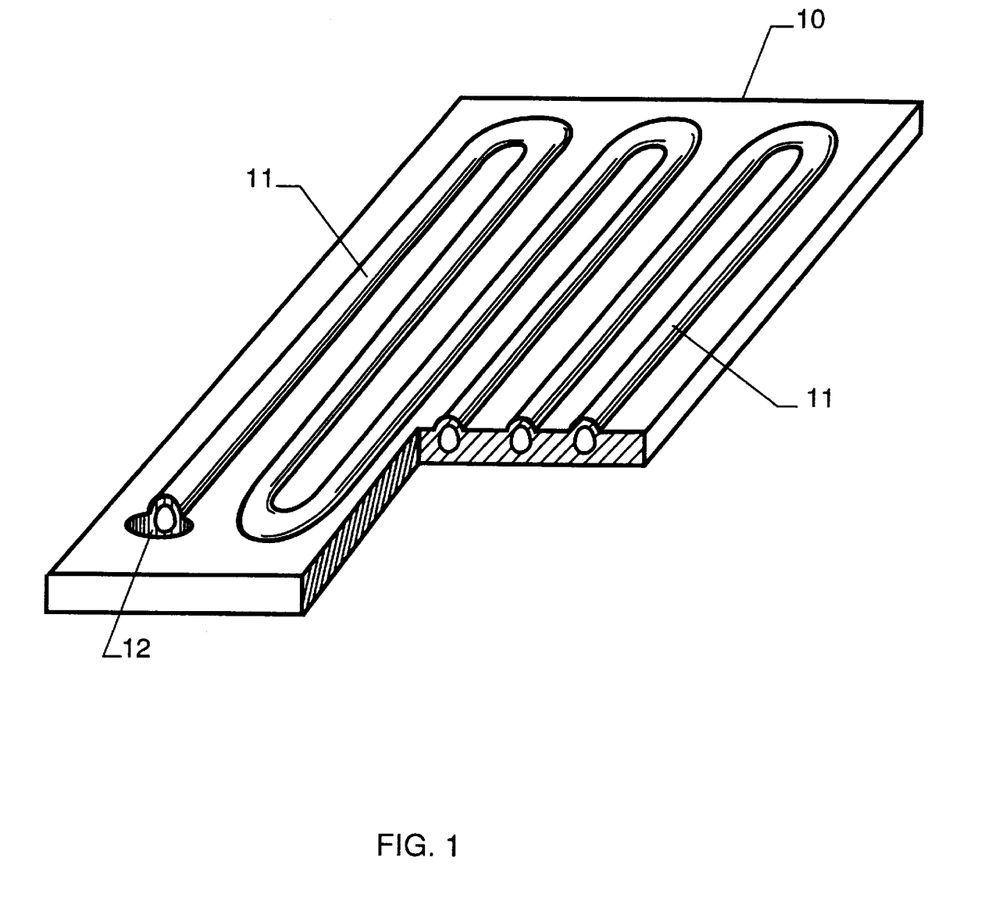
FIG. 1 is a perspective view illustrating an embodiment of a glass article capable of being produced by the forming method disclosed herein.

FIG. 1 illustrates one typical embodiment of a glass article 10 capable of being produced using the forming method disclosed herein. The glass article 10 exhibits at least one internal or enclosed channel 11, i.e., a glass envelope. This channel possesses tubulation ports 12 at the opposite ends of the channel, each communicating with the external environment. These tubulation ports are the sites where the internal/enclosed channel of the glass article may be evacuated and thereafter backfilled with neon or other inert gas. In order to complete the manufacture of the light-emitting device, electrodes (not shown) may be attached to these tubulation ports (or other sites where ports have been located) via a glass-to-glass seal once the glass article is evacuated and backfilled. For example, the tubulation ports and glass enclosed electrodes may be flame sealed together, i.e., the port and the glass enclosed electrode can be flame softened, coupled together and thereafter allowed to cool and subsequently seal together. Additionally, the article could possess a plurality of internal channels in a predetermined pattern each possessing at least a pair tubulation ports at the opposite ends of each respective channel.

Figure 2:
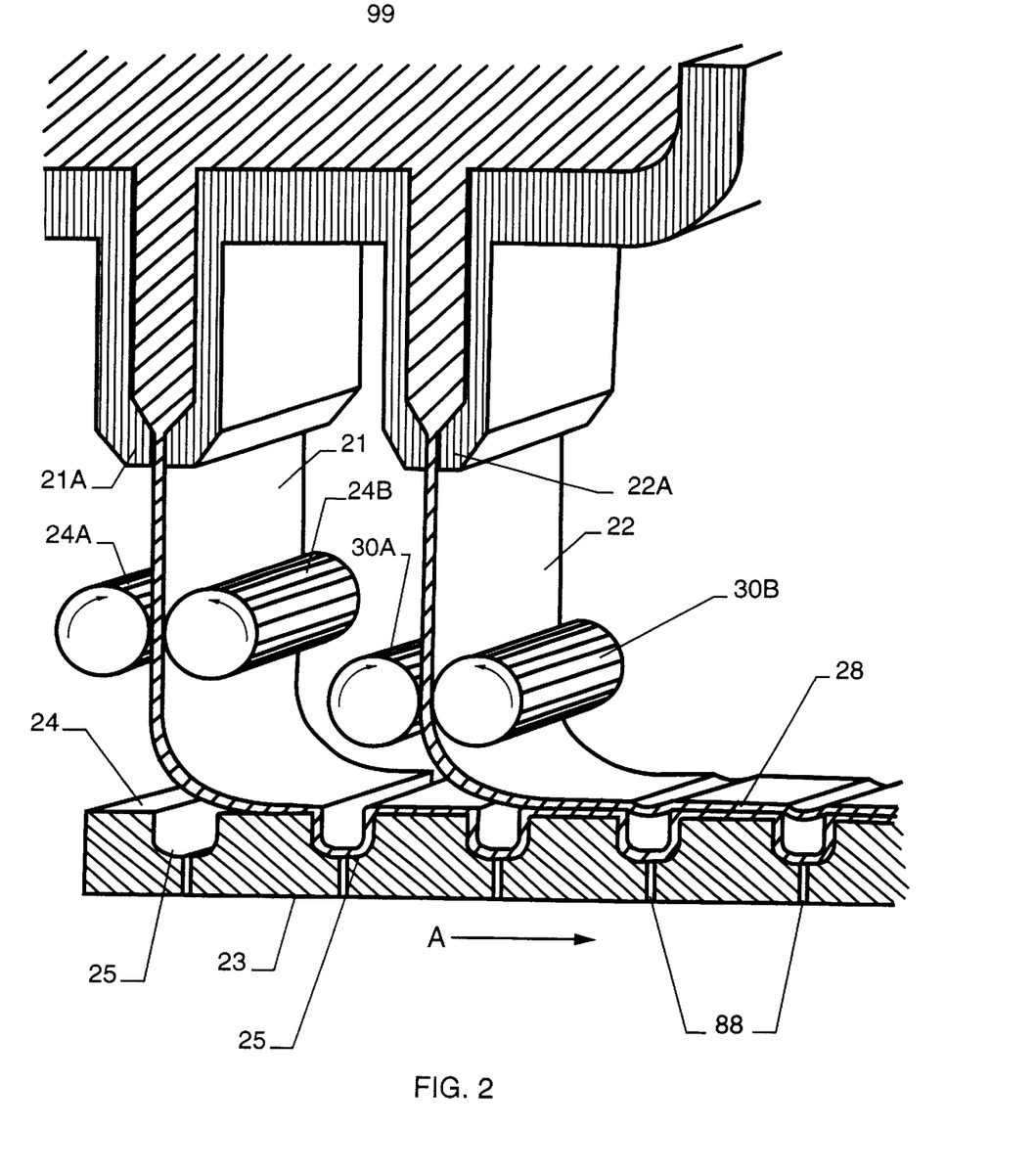
FIG. 2 is diagrammatic perspective and cutout view of the method in accordance with the present invention.

Referring now to FIG. 2, illustrated is the apparatus for forming glass articles containing internal enclosed channels, i.e. or glass envelopes utilizing the inventive method disclosed herein; the apparatus being similar to that disclosed in U.S. Pat. No. 4,361,429 (Anderson et al.), which is hereby incorporated by reference. In general, the instant method comprises the following steps: (a) delivering and depositing a first or channel-forming ribbon of molten glass 21 to a surface of a mold assembly 23 having a mold cavity area 24 possessing at least one channel-forming groove 25 formed therewithin and a peripheral surface area 28, wherein the channel-forming ribbon 21 overlies the mold cavity area 24 and the peripheral surface 28 areas of the mold assembly; (b) causing the channel-forming ribbon 21 of molten glass to substantially conform to the contour of the mold cavity resulting in the formation of at least one channel in the ribbon of the molten glass deposited; (c) delivering and depositing a second or sealing ribbon of molten glass 22 to the outer surface of the channel-forming ribbon 21 of molten glass wherein the viscosity of the sealing ribbon 22 is such that the sealing ribbon 22 (i) bridges but does not sag into complete contact with the surface of the channel of the channel-forming ribbon and (ii) forms a hermetic seal wherever the sealing ribbon 22 contacts the channel-forming ribbon 21 thereby resulting in a glass article possessing at least one enclosed channel; and, (d) removing the glass envelope from the mold.

The actual delivering of the glass ribbon, assuming a product exhibiting two layers requires the utilization of two separate glass delivery orifices. In the case of products that could be made from narrow ribbon, i.e., a ribbon size of up to about 10" wide, a simple round orifice would be sufficient. On the other hand, if thin products are to be produced, exhibiting a thickness of up to about 0.1", a near "net shape" delivery system is preferable, i.e., using an orifice which exhibits a high aspect ratio similar to the product itself For instance, a slotted-type orifice could deliver molten glass exhibiting a thermal uniformity which would ultimately result in glass articles of the best quality.

Referring again to FIG. 2 molten glass from a common furnace (not shown) and a common "main-line" forehearth 99 which is split into a "Y" shaped delivery conduit is delivered to separate orifices 21A and 22A which thereafter deliver respective streams of glass to two sets of water-cooled rollers 24A/24B and 30A/30B. A forehearth temperature control (not shown) could allow each conduit to be controlled separately, thus allowing the molten glass within each conduit to be maintained at different temperatures, therefore allowing two separate molten glass streams to be delivered with different glass viscosities. The first of the two fixed orifices 21A delivers a stream of molten glass to a first set of two water-cooled rollers 24A and 24B, rotating in opposite directions, which thereafter squeeze the hot glass into to a continuous ribbon shape upon exiting the rollers. These rollers may be adjusted for the proper spacings depending upon the desired ribbon thickness for the desired product dimensions. Patterns may also be machined into the rollers for purposes of changing the thickness distribution of the glass ribbon as well for as imparting knurled or decorative patterns to the surface of the so-formed glass article.

Upon exiting the rollers 24A and 24B, the channel-forming molten glass ribbon 21 is deposited upon mold assembly 23 which is moved along a predetermined path A corresponding to a direction along the mold's width. The mold could be positioned such that the mold assembly is moved, and the ribbon is subsequently deposited, in a direction along the mold's length. Referring now to FIG. 2 depicted therein is a cutout portion of the mold assembly depicted in FIG. 3 and as indicated by the line A—A.

Figure 3:
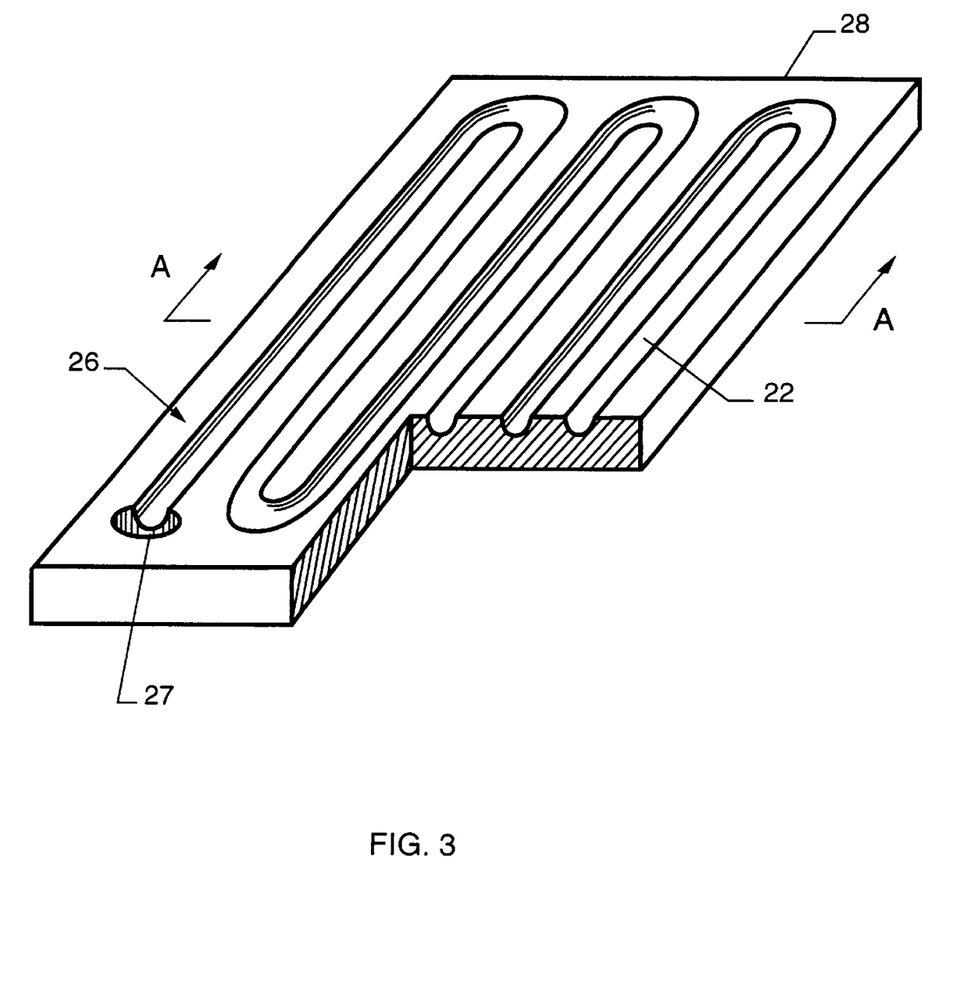
FIG. 3 is perspective view illustrating the mold utilized in the inventive method for forming the glass article depicted in FIG. 1.
Figure 4:
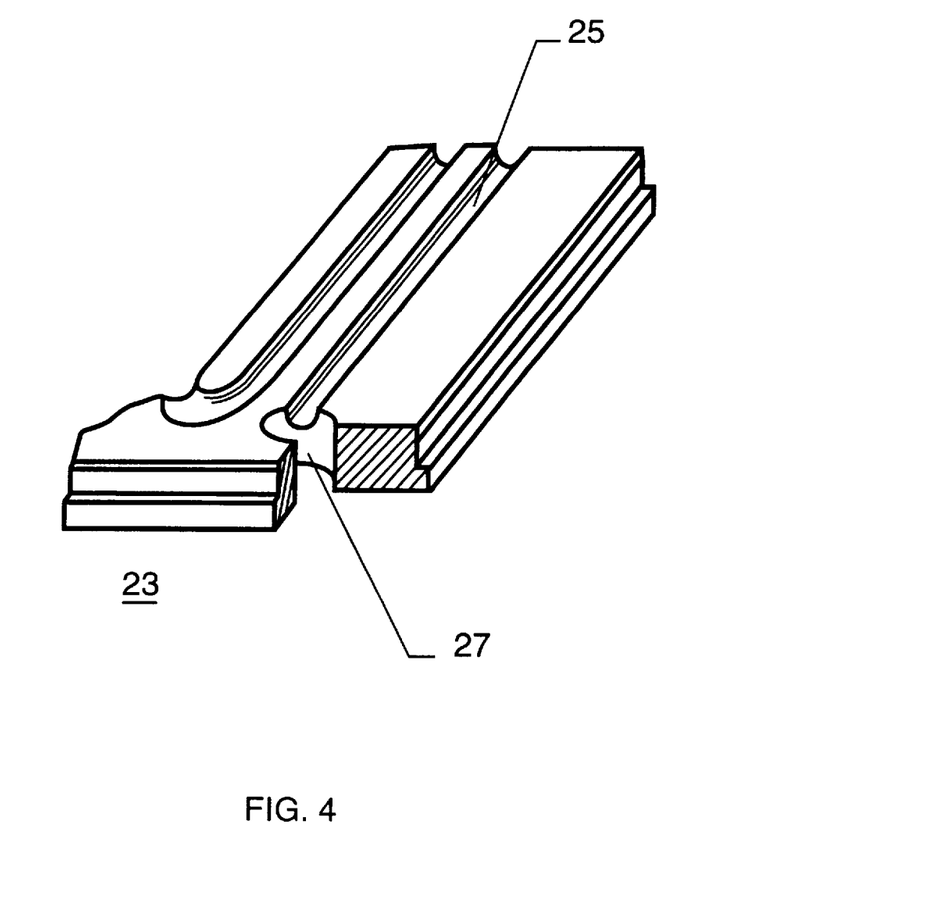
FIG. 4 is a fragmental sectional view illustrating the portion of the mold illustrated in FIG. 2 wherein the deep draw pockets are located.

Referring now specifically to FIG, 3, the mold assembly 23 has a predetermined shape possessing the proper design necessary to result in product which meets desired final product specification, i.e., a distribution of grooves, indentations, holes, inserts and peripheral edges. Additionally, it is self evident that the shape and configuration of the groove design imparted to the mold determines the form and pattern of the so-formed glass article and ultimately the neon lighting device formed therefrom. Referring now to FIGS. 3 and 4, illustrated therein is one embodiment of a mold assembly 23 in accordance with the present invention, i.e., a mold designed to produce the glass article depicted in FIG. 1. Mold assembly 23 possesses at least one channel-forming groove 25 in the desired or predetermined pattern and two "deep-draw" pocket areas 27 at the respective ends of the groove 25 for forming the aforementioned tubulation ports; molten glass will be drawn (gravity drawn or by vacuum actuation) into these pockets 27 to form tubulation ports- FIG. 4 provides an enlarged view of the channel end and the respective deep draw pocket area 27. Utilization of a mold assembly which possesses these two deep draw pockets results in the formation of a shaped glass article which possesses areas, i.e., tubulation ports, which are better designed for easier evacuating and backfilling with an inert gas. As will be described hereinafter these tubulation ports are modified so as to allow for easier attachment of the electrodes necessary for producing the neon lighting devices.

Referring again to FIG. 2, preferably the bulk viscosity of this channel-forming glass ribbon, as deposited should be about between 2000–5000 poise. The glass ribbon 21 is deposited thereon so as to overlie the mold cavity area 24 containing the groove forming channel 25 and the surrounding peripheral surface area 28. Once delivered this channel-forming glass ribbon 21 is thereafter caused to substantially conform to the contour of the mold cavity resulting in the formation of at least one channel in the delivered ribbon of the molten glass. The channel forming ribbon 21 of molten glass may be allowed to substantially conform to the contour of the mold cavity channel forming groove 25 solely by means of the force of gravity.

In a preferred embodiment, resulting in enhanced and accelerated conformance of the molten glass to the contour of the mold cavity channel forming groove 25 the method may involve the additional step of applying a vacuum to the under surface of the channel forming ribbon of molten glass 21. As soon as the complete mold area is covered by the hot glass ribbon, a vacuum is applied between the mold and the channel-forming molten glass ribbon 21 via a vacuum line (not shown) attached to vacuum-vent holes 88 which are routed from several locations on the glass surface of the mold, at the bottom of its machined grooves, through the mold body itself, and finally attaching to the vacuum source (not shown). A vacuum may be applied immediately after the channel-forming ribbon of molten glass is deposited, or such vacuum may be applied immediately after the ribbon has initially sagged partially within the mold cavity channel forming groove. When the vacuum is applied between the glass and mold, the glass is forced to be in immediate and intimate contact with the mold, allowing the glass to be formed to the desired shape, while also initiating the cooling and hardening of the channel forming ribbon.

Following the conformance of the channel-forming molten glass ribbon 21 to the mold cavity, through either gravity or vacuum forming or a combination of the two, the mold assembly 23 is thereafter further moved along the direction A and thereafter positioned under the aforementioned second set of water-cooled rollers 30A and 30B. As earlier mentioned, a stream of molten glass is directed from the second orifice 22A and thereafter to the water-cooled rollers 30A/30B which are rotating in opposite directions. These rollers thereafter squeeze the molten glass into to a continuous ribbon shape, i.e., sealing ribbon 22, which is deposited upon and overlies the surface of the channel-forming molten glass ribbon 21 which has conformed to and is supported by the mold cavity 24 and peripheral surfaces 28. This sealing ribbon of molten glass 22 simply lies on the channel forming ribbon, bridging itself across the formed channels due to the relatively high viscosity of the sealing ribbon, Specifically, the bulk viscosity of the sealing ribbon 22 of molten glass, as deposited on the channel-forming ribbon 21, is such that the sealing ribbon 22 bridges the previously formed channel but does not sag into contact with the surface of the channel of the channel-forming ribbon. Furthermore, the temperatures of the respective glass ribbons, channel-forming and sealing, are such that the two ribbons hermetically seal together wherever they touch via inherent flow viscosity characteristics of the particular glass used for fabricating the chosen product. Preferably, the bulk viscosity of the sealing ribbon 22 when deposited onto the channel-forming ribbon 21 of molten glass is similar to that of the channel-forming ribbon as deposited; i.e., a bulk viscosity range between 2000–5000 poise. The channel forming ribbon is delivered at a slightly lower initial bulk viscosity in order to compensate for the working time prior to delivery of the sealing ribbon.

It follows that the bulk viscosity of the channel-forming ribbon of molten glass at the time of this second deposition is higher than that of the earlier delivered molten glass due to the working time or cooling which has occurred. Furthermore, a surface-to-mold viscosity gradient is likely to have developed in this channel forming ribbon. However, this channel forming ribbon should not have been allowed to cool or become so viscous at its surface that the two ribbons can not "set up" wherever they contact and therefore not form the desired hermetic glass-to-glass seal. Ideally, the viscosity conditions (bulk and surface viscosity) which, as described above, should be maintained/achieved are conditions whereby the molten glass ribbons will form a hermetic seal wherever they contact; i.e., glass viscosities when the sealing ribbon is delivered and deposited on the channel-forming ribbon such that a glass-to-glass hermetic seal is formed. Furthermore, it is also necessary to minimize the surface to mold viscosity gradient of the channel-forming ribbon so that unnecessary stresses do not build up within the so-formed glass article. By utilizing rollers and molds which are comprised of a low conductive material less heat will be extracted from the surface of the glass ribbon and therefore less of viscosity gradient has developed. In addition, the quicker the second deposition of the sealing ribbon takes place less the variation in the surface to mold viscosity. In sum, the materials which should be used for the roller and the mold, as well as the cycle time between the ribbon deliveries should be empirically determined by one skilled in the art such that a hermetically sealed glass article exhibiting manageable internal stresses results.

Sealing molten glass ribbon 22 could be subjected to forming measures in addition to those imparted to it by gravitational forces, including pressing the cover ribbon with pressing or plunger apparatus (not shown) for purposes of assuring good glass-to-glass sealing between channel forming 21 and sealing ribbons 22. However, care should be taken to press the sealing ribbon 22 into position whereby the sealing ribbon bridges but it not pressed into contact with the entire surface of the channel formed in the channel-forming ribbon 21.

In a preferred embodiment of the above method the "deep draw" pockets are in communication with an air line/orifice and at least a partial vacuum is maintained during deposition of the channel forming ribbon resulting in the glass in the cavity remaining open; i.e., the glass deposited and pulled into the "deep draw" pocket ruptures rather than seals upon cooling. After deposition of the sealing ribbon, air is blown into and through the air line/orifice and into contact with the glass article. This air aids in preventing the sealing ribbon from significantly sagging or collapsing completely or partially down into the channel of the first ribbon sheet. On the other hand, if the pressing or plunger apparatus of a desired shape or surface design is brought into contact with the sealing ribbon, while the air is blown through the line, the sealing glass ribbon would be forced into to substantial contact with the plunger surface.

Figure 5:
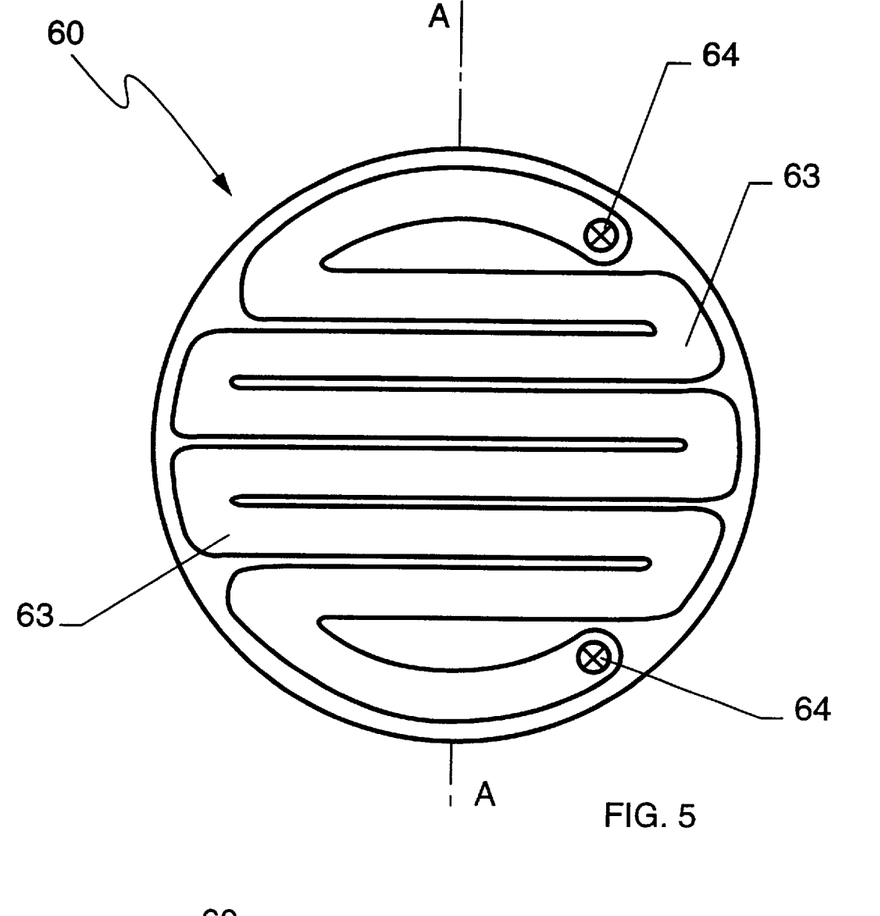
FIG. 5 is a plan view of an additional embodiment of a glass envelope capable of being produced by the forming method described herein.
Figure 6:
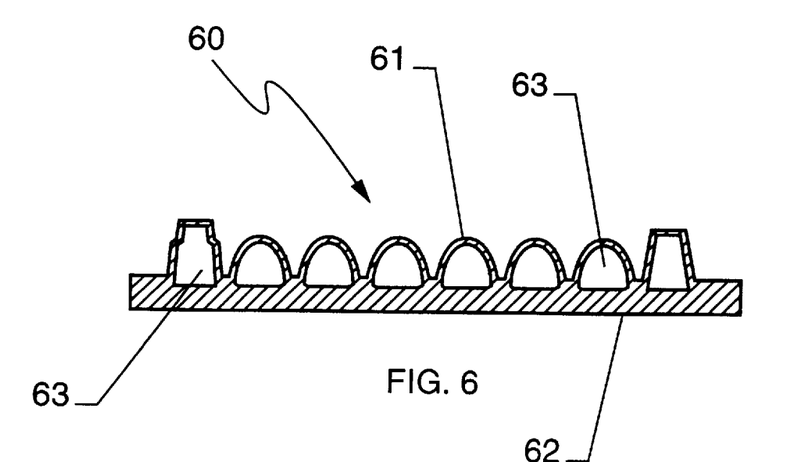
FIG. 6 is a side view of the glass envelope illustrated in FIG. 6.

As generally disclosed above, FIG. 1 illustrates a typical embodiment of a glass article 10, a glass envelope, the formation of which is enabled as a result the discovery of the inventive forming method disclosed herein. FIGS. 5 and 6 illustrate a more intricate glass envelope, the formation of which is also enabled by this inventive method; depicted therein is a lightweight sealant-free, thin glass envelope 60, i.e., a glass envelope comprising a front surface 61 and a back surface 62 laminated and integrated together to form a unitary envelope body which is essentially free of any sealing materials. The glass envelope is formed such that it has at least one gas discharge channel 63 and exhibits a weight to area ratio of $\leq 1.0$ g/cm$^2$; preferably, a ratio less than 0.5 g/cm$^2$. Tubulation ports 64 are located the opposite ends of the channel, each communicating with the external environment. As mentioned above, these tubulation ports provide access to the internal/enclosed channel which allow the glass article to be evacuated and thereafter backfilled with an ionizable medium or gas discharge.

Figure 7:
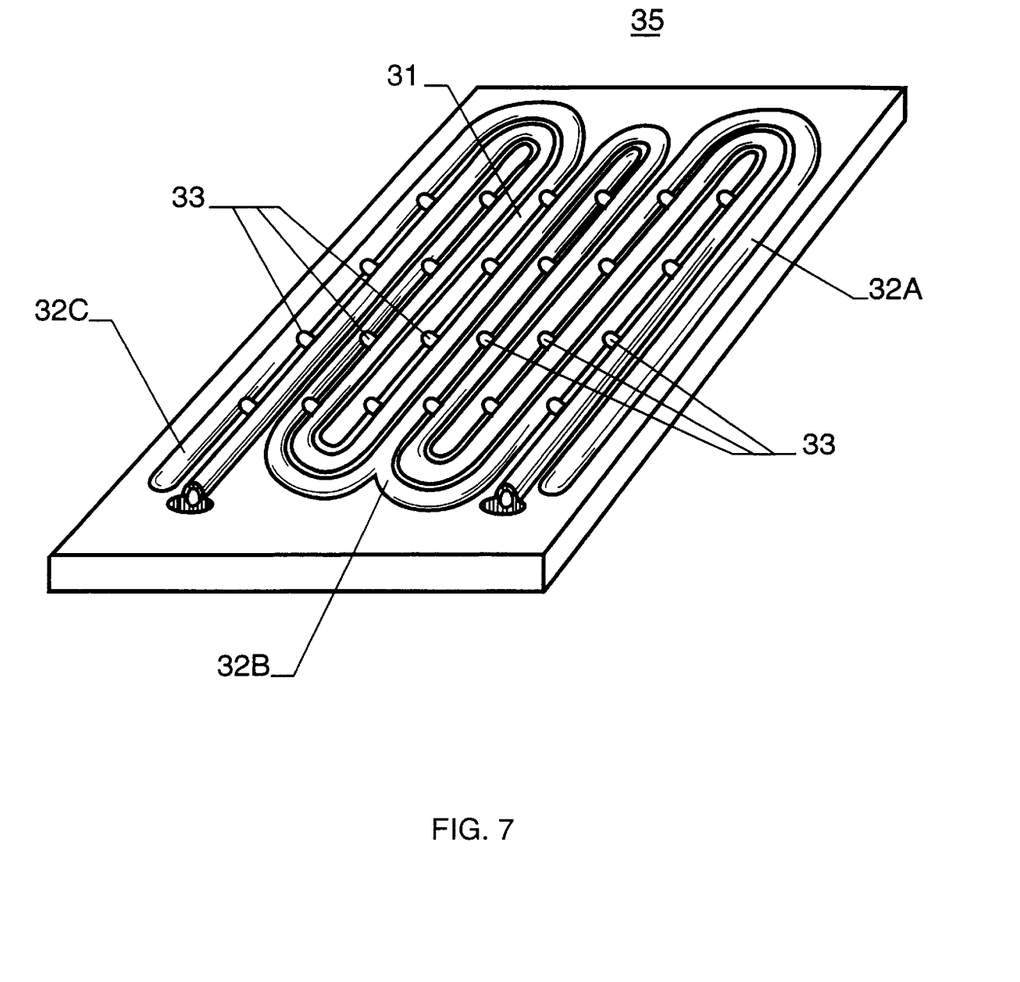
FIG. 7 is a perspective view illustrating another embodiment of a glass envelope capable of being produced by the forming method disclosed herein.

The envelope could possess a plurality of internal channels in a predetermined pattern each possessing at least a pair tubulation ports at the opposite ends of each respective channel. For example, FIG. 7, illustrates a further embodiment of an glass article or envelope 35 having a plurality of channels which capable of being produced utilizing the instant and inventive method. The glass envelope possesses an internal or is enclosed primary channel 31 and a series of secondary channels 32A, 32B and 32C which are adjacent to and which are connected to the primary channel 31 via a plurality of connecting passages 33. The primary channel possesses the tubulation ports and therefore will ultimately be the channel where the electrodes will be located. These connecting passages 33 function to allow the so-formed device's primary or excited channel 31 to be replenished or resupplied with the inert gas which may be located in the secondary channels 32A, 32B, and 32C.

The glass envelopes disclosed hereinabove are preferably comprised of a transparent glass material, preferably a hard glass exhibiting excellent thermal expansion characteristics selected from the group consisting of soda-lime silicate, borosilicate, aluminosilicate, boroaluminosilicate and the like.

Figure 8:
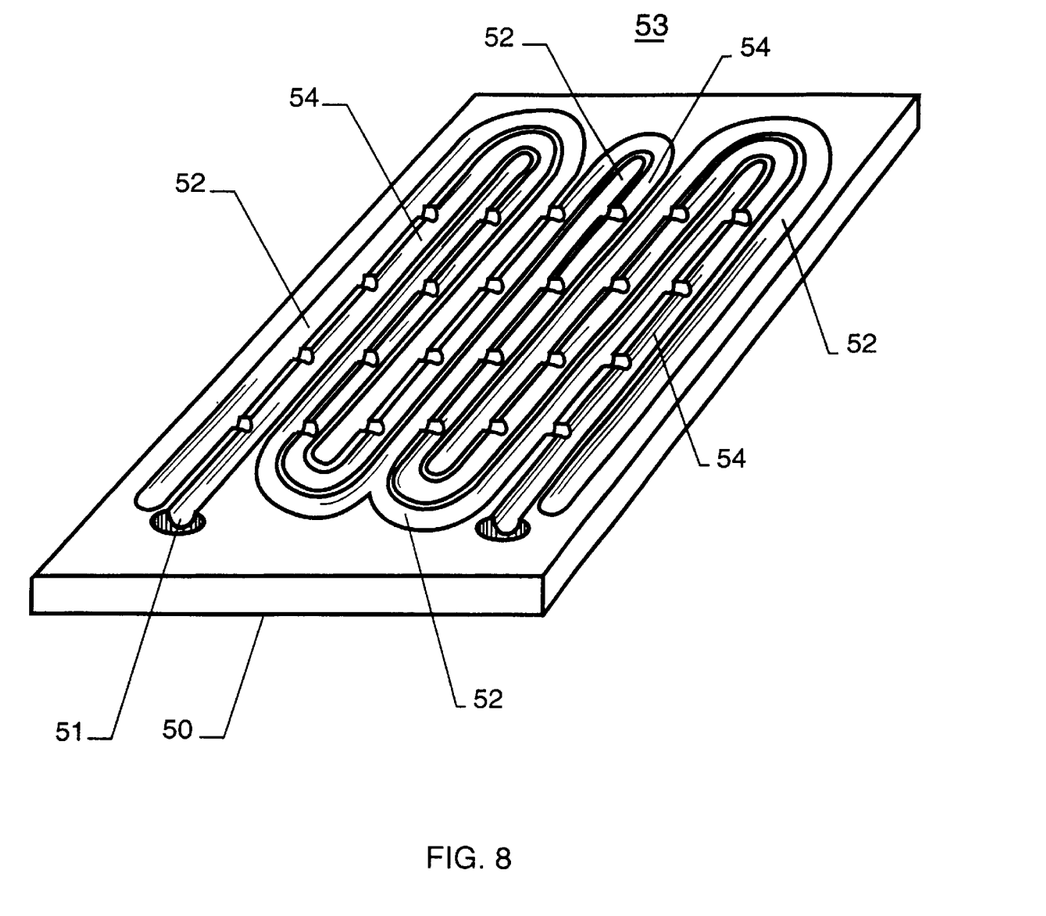
FIG. 8 is a perspective view illustrating the mold utilized in the inventive method for forming the glass envelope depicted in FIG. 7.

The method for forming the glass article illustrated in FIG. 7 involves the identical method as described above with the only difference being the use of a modified embodiment of the previous mold assembly 23. Referring now to FIG. 8, a mold assembly 53 for producing the plural channel glass envelope is illustrated. Mold cavity area 50 exhibits primary channel forming grooves 51 and secondary channel forming grooves 52, wherein the primary and secondary channel forming grooves are adjacent each other. Additionally, the mold cavity 50 possesses a plurality of ridges 54 between the primary 51 and secondary 52 channel-forming grooves. Strategically located on these ridges and between the primary 51 and the secondary channel 52 grooves, are a series of notches which create "valleys" and upon subsequent molding result in the aforementioned connecting passages in the deposited first glass ribbon sheet. In turn, these valleys will be "bridged" by the deposited second glass ribbon sheet, leaving the designed connecting passages at those strategic spots.

One final alternative embodiment of the inventive method described herein involves, subsequent to the application of the channel-forming ribbon 21 but prior to the application of the sealing ribbon 22, depositing an intermediate ribbon of molten glass upon and which overlies the surface of the channel-forming molten glass ribbon 21 which has conformed to and is supported by the mold cavity and peripheral surfaces. The viscosity of this intermediate ribbon of molten glass as deposited, is such that the intermediate ribbon bridges the channels of the channel-forming ribbon and does not sag into contact with the channel forming ribbon channel surface. However, the intermediate ribbon of molten glass should still be molten enough to form a hermetic seal wherever it contacts the channel-forming ribbon. Preferably, the viscosity of the intermediate ribbon of molten glass ranges between 2000–5000 poise. Lastly, this intermediate ribbon may also be subjected to pressing wherein the ribbon is pressed into position such that it bridges but it not pressed into 100% contact with the surfaces of the channels formed by the channel forming ribbon.

Figure 9:
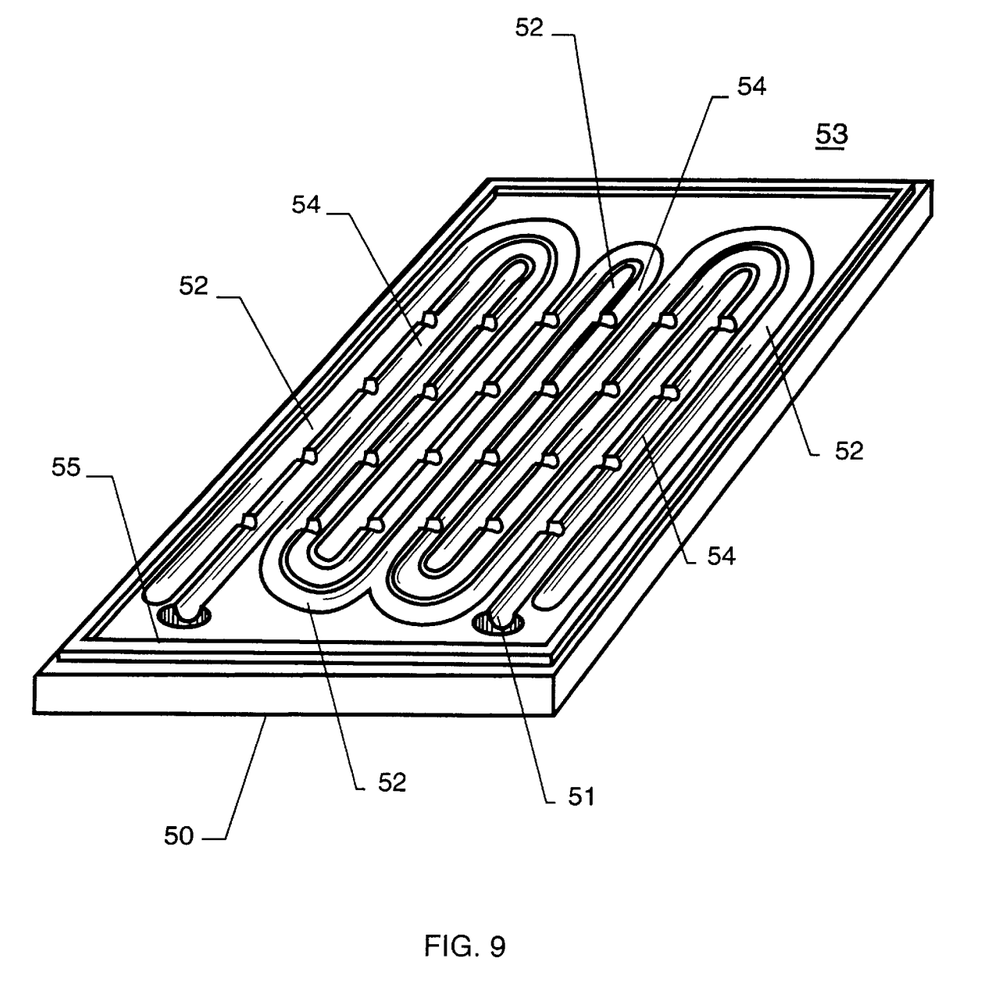
FIG. 9 is modified embodiment of the mold depicted in FIG. 8.

Referring now to FIG. 9, depicted therein is a final embodiment of a mold which could be utilized in the aforementioned inventive glass article formation method This mold is similar to the mold depicted in FIG. 8 in that it contains a mold cavity area 50, adjacent primary and secondary channel forming grooves 51 and 52 and a plurality of ridges 54 between the adjacent grooves 51 and 52 which contain notches designed to result in the formation of the aforementioned connecting passages. This mold does, however, exhibit a further feature not found in the aforementioned earlier molds, specifically it possesses a "draw ring" 55 located outside the mold cavity area. This concentric metal ring located on the periphery of the mold assembly should be of the same shape as the "trim edge" of mold proper, i.e. the same shape as the actual design of the glass article outside configuration. This "draw ring" is positioned slightly above the mold "trim edge" elevation in such a manner as to support the glass ribbon deposited on the periphery, so that the ribbon does not contact the trim edge or the peripheral edges of the product's mold proper. This function of this "draw ling" is to keep the glass hot and in a low-viscosity state in the area of the trim edge of the mold, so that later in the process, when the outside portion of the ribbon is trimmed from the product proper, the glass in the trim area is still soft/hot, has a low viscosity gradient and is pliable enough to allow a successful trim completion without checking or causing a ragged trim surface. Stated in another way, the function of the "draw ring" is to keep those portions of the channel forming glass ribbon deposited upon the mold assembly and which extend peripherally about the mold cavity maintained in a spaced relationship with the peripheral surface portions of the mold assembly.

Upon completion of the molding operation it becomes necessary to trim the excess glass from the periphery of the glass article and thereafter remove the glass article. Generally, any trimming operation should sever the product, which is supported by the mold, from the excess hot glass cullet which surrounds the periphery of the mold. Furthermore, the trimming operation should be designed such that it results in a positive seal to the outside edges of both ribbons. One skilled in the glass art would be able to design a suitable trimming operation which would result in the desired glass substrate. Two suitable trimming operations, one "male" and one "female", which could be utilized are disclosed respectively in U.S. Pat. Nos. 4,605, 429 (Rajnik) and 3,528,791 (Giffen); both of which are hereby incorporated by reference.

As described above the method is designed such that tubulation port sites are molded into the glass articles, however these sites during the molding operation may become sealed by a thin layer of glass which has formed over the bottom section of the port. Specifically, when the tubulation pocket was vacuum formed, the glass thickness distribution may become such that the sidewalls and the bottom section of the pocket are thinner than the main product body or the neon main channel. Thus, it may become necessary to "open up" the tubulation ports so that these sites can be utilized for evacuation, backfilling and as subsequent electrode attachment sites. One method of accomplishing this "opening up" is to sear through the bottom section of tubulation port by applying a high-temperature burner which utilizes a gas/oxygen mixture. A sharp high-temperature fire, i.e., an approximately 2:1 gas/oxygen at approximately 2750° C., is impinged thereupon the bottom section of the tubulation port, resulting in the softening of the glass and subsequently pulling into itself and opening up of a hole at the bottom of the pocket. Specifically the burner causes the gas/air inside the glass article to increase which, in turn causes an increase in the internal pressure which thereafter causes the port to open. After this "hole-opening" procedure is completed, the sidewalls of the tubulation ports are further softened by gas-air burners exhibiting a lower temperature than the first gas-oxygen burners; a temperature of approximately 1000° C. less. Upon completion of that "softening" procedure, a metal plunger thereafter forms the desired shape of the tubulation port.

Lightweight, internally channeled light-emitting devices can be formed from any of the aforementioned thin glass envelopes. For example, electrodes may be attached to the glass envelope illustrated in FIG. 5. Electrodes (not shown)

may be attached, at opposite ends of and in communication with, the glass envelope's 60 gas discharge channel 63; the discharge channel having been evacuated and filled with a discharge or ionizable gas. Typically, the electrodes are attached to the tubulation ports 64 (or other sites which are in communication with the channel) via a glass-to-glass seal, i.e., vacuum sealed to form discharge paths. The electrodes may protrude outwardly of the glass envelope at the tubulation port sites and should be in electrical communication with the interior of the discharge or ionizable gas channel 63. Lastly, a means for activating the discharge or ionizable gas should be provided. Specifically, an alternating voltage (a high voltage AC source) should applied across the electrodes whereby the electrical interaction between the electrodes will result in an ionization path between the electrodes located at the respective ends of the gas channel.

A variety of gases, gas mixtures and gas pressures may be used to fill the discharge or ionizable gas channels to achieve various colors and intensities of light using AC drive voltages, including, but not limited to, mercury, xenon, krypton, argon, neon, helium and mixtures thereof. Furthermore, combining specific phosphorescent chemicals with a specific gas will result in additional color combinations.

In one embodiment, the internally channeled light-emitting device of the invention can operate to provide neon illumination. In such a case, the gas channels would be charged with neon gas and the neon gas would produced direct light responsive to an electric discharge from the electrodes.

In another embodiments the ionizable gas which produces ultra-violet light responsive to an electrical discharge is contained under a partial vacuum within the gas channels. An ionizable gas mixture comprising a mixture of inert gases such as argon and a small percentage of mercury gas is suitable for this purpose. Gas pressure in the cavities would preferably within the range of three to thirty torr. The inner surfaces of in the gas channels would be coated with a suitable activated powder phosphor, such as magnesium tungstate or calcium fluorochlorophosphate:antimony:manganese. As is well known, the gas is excited by electrons discharged from the electrodes and produces ultra, violet light. The phosphor coating absorbs the ultra violet radiation and reradiates at wave lengths visible to the human eye.

Additional phosphorescent chemicals which may be suitable for use in the internally channeled light-emitting device of the invention include: manganese and lead activated calcium metasilicate ($CaSiO_3$:Mn:Pb), lead activated calcium tungstate, Ca(W $O_4$: Pb), zinc orthosilicate:manganese ($ZnSiO_4$:Mn) and yttrium oxide:europium ($Y_2O_3$:Eu).

Figure 10:
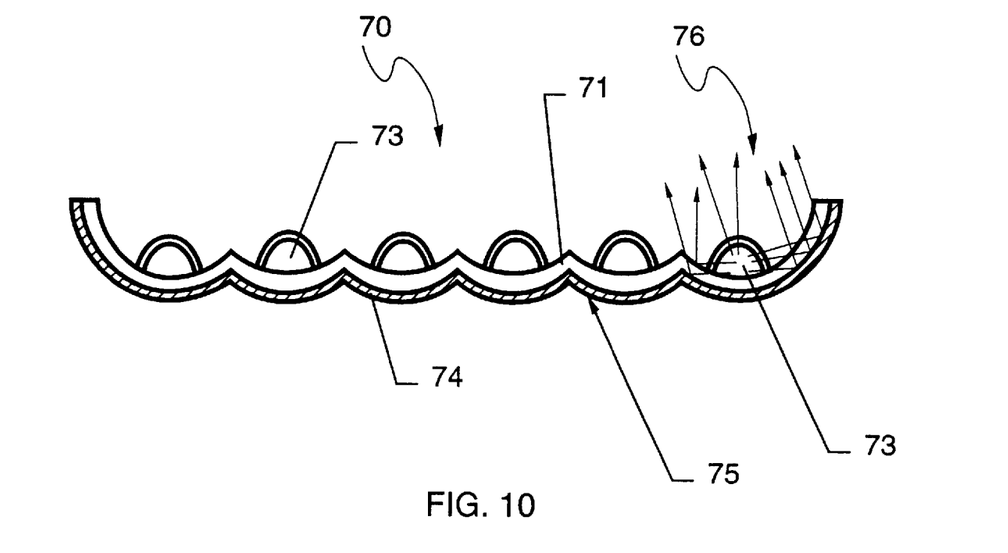
FIG. 10 is a sectional view an internally channeled light-emitting device.

Referring now to FIG. 10 illustrated therein is a further embodiment of a internally channeled light-emitting device 70. Light-emitting device 70 includes an envelope which is comprised of a front surface 71 and a back surface 72 laminated and integrated together to form a unitary envelope body. The glass envelope is formed such that it has at least one gas discharge channel 73. Light-emitting device 70 further includes a light reflecting layer 74 provided oil a non-luminous back side 75 of back surface 72; the reflecting layer is formed directly on or integrally with the transparent back glass surface. As described above the channel is evacuated and filled with a discharge or ionizable gas.

Reflecting layer 74 is formed by a film of metal, metallic oxide or resin, including but not limited to aluminum, chromium, silver or gold coatings with a reflectivity over 10%. The coatings ale applied by sputtering, evaporation, chemical deposition or mechanical means, i.e., embossing, and may be applied as patterns or may be uniform and continuous. The resistivity varies from 0.01 to 10 ohms/square for the reflective layer.

The back side of the back surface containing the reflective layer creates a phenomenon whereby the light is caused to be reflected by the reflecting layer so that the light radiates outwardly in uniform distribution from the front side surface of the transparent glass assembly. Specifically, the light produced in the channels is transmitted through the walls in a forward direction and thereafter is intercepted and redirected forward by the reflector layer; this light path/pattern is generally shown by the arrows designated 76. As the shape of the glass envelope and thereby the shape of the back glass surface dictates the shape of the reflector layer, it is contemplated that the glass surface may therefore be designed so as to form a reflective surface which directs light in a pattern which meets specifications for automotive rear lighting.

Since the light-emitting device is constructed by two flat transparent glass plates placed one over the other and laminated and integrated together, the device can be both thin and light even after the light reflecting layer has been added to the transparent glass plates. In other words, the invention provides a light and compact flat type fluorescent lamp device having uniform light distribution and, even where the reflecting layer is provided at the back of the glass envelope assembly, the device is light and compact and the device is particularly suited to and has practical value and application as a automotive rear lighting device.

EXAMPLES

Example 1

Utilizing the inventive method as described above a two layer product was produced possessing a design similar to that depicted in FIG. 5 i.e., possessing a pair of adjacent channels, one primary and one secondary which are in communication via a series of communicating orifices. This two layer glass article possessed dimensions of 18"×6"×0.5" and was fabricated out of Corning Code 7251 glass. This glass consisted essentially of the following composition, expressed in terms of weight percent on the oxide: 77.4% $SiO_2$, 5.3% $Na_2O$, 15.4% $B_2O_3$, 1.9% $Al_2O_3$, 0.48 Cl. The viscosity of both the channel forming molten glass and the sealing ribbon molten upon delivery and deposition to the mold assembly was between 2000–5000 poise which, for this glass composition, is equivalent to between 1250°–1375° C. Annealing and softening points of this glass composition are 550° and 792° C. respectively. The mold material utilized was stainless steel 420 while the rollers utilized were fabricated of Inconel 718; both materials considered low conductive materials. One final parameter which should be noted was that the interval between delivery of the channel forming ribbon and sealing ribbon was approximately 12 seconds; however, simultaneous delivery is ultimately intended.

Example 2

Another embodiment of a two layer product was produced possessing a design similar to that illustrated in FIGS. 5 and 6, i.e., possessing a single, intricately patterned discharge gas channel. This two layer glass envelope, comprised of the same boroaluminosilicate glass as in Example 1, possessed approximate dimensions of 4⅝"×6"×0.25" (11.75 cm×15.24 cm×0.64 cm) and exhibited a weight of approximately 3 ounces (85.05 g), a weight/area ratio of 0.47 g/cm². This weight/area ratio compares favorably to prior art glass articles utilized in lighting devices, i.e., those comprised of glass plates hermetically sealed together to form a device with internal and enclosed channels which possess weight/area ratios far in excess of 1.0 g/cm². For example, a hermetically sealed device having approximately the same dimensions as above, 11.75 cm×15.24 cm. 0.64 cm, exhibited a weight of approximately 9 ounces which equates to a weight/area ratio of 1.27 g/cm².

Although the now preferred embodiments of the invention have been set forth, it will be apparent to those skilled in the art that various changes and modifications may be made thereto without departing from the spirit and scope of the invention as set forth in the following claims.

We claim:

1. An internally channeled light emitting device comprising a thin glass envelope having a front surface and a back surface laminated and integrated together to form a unitary envelope body essentially free of any sealing materials and having at least one gas discharge channel, the glass envelope exhibiting a weight to area ratio of $\leq 1.0$ g/cm², each channel provided with a discharge or ionizable gas and at least two electrodes in communication with, and located at opposite ends of, the at least one gas discharge channel for generating an arc discharge therebetween.

2. The light emitting device of claim 1 wherein the back surface is provided with an integral reflecting means.

3. The internally channeled light emitting device of claim 1 wherein the glass glass envelope is composed of material that is selected from the group of glasses consisting of borosilicate, aluminosilicate, boroaluminosilicate and soda-lime silicate.

4. The internally channeled light emitting device of claim 1 wherein the activation of the discharge or ionizable gas is accomplished by applying an electrical current across the at least two electrodes.

5. The internally channeled light emitting device of claim 1 wherein the discharge gas is selected from the group consisting of mercury, xenon, krypton, argon, neon, helium and mixtures thereof.

6. A thin glass envelope for enclosing a discharge gas or ionizable medium for use as a lighting device, the envelope comprising a front surface and a back surface laminated and integrated together to form a unitary envelope body essentially free of sealant materials and having at least one discharge or ionizable gas channel, the front and back surfaces comprised of a glass material selected from the group of glasses consisting of borosilicate, aluminosilicate, boroaluminosilicate and soda-lime silicate.

7. The thin glass envelope of claim 6 wherein the at least one discharge or ionizable gas channel includes at least one evacuation and filling tubulation port in communication with the external environment thereby providing access to the at least one discharge or ionizable gas channel to allow the glass envelope to be evacuated and thereafter backfilled with a discharge or ionizable gas.

8. The thin glass envelope of claim 6 wherein the envelope includes a pair of tubulation ports located at opposite ends of the at least one discharge or ionizable gas channel.

9. An internally channeled light emitting device comprising a thin glass envelope having a front surface and a back surface laminated and integrated together to form a unitary envelope body essentially free of any sealing material having a primary gas discharge channel and at least one secondary gas discharge channel adjacent to and in communication with the primary gas discharge channel, channel provided with a discharge or ionizable gas, the primary gas discharge channel having at least two electrodes in communication with, and located at opposite ends of, the primary gas discharge channel for generating an arc discharge therebetween, the front and back surfaces comprised of a transparent glass material.

10. The internally channeled light emitting device of claim 9 wherein the thin glass envelope exhibits a weight to area ratio of $\leq 1.0$ g/cm².

11. An thin glass envelope for enclosing a discharge gas or ionizable medium for use as light emitting device, the envelope comprising a front surface and a back surface laminated and integrated together to form a unitary envelope body essentially free of sealant materials and having at least one discharge or ionizable gas channel, and at least one secondary channel adjacent to and in communication with the primary channel.

12. The thin glass envelope of claim 11 wherein the envelope exhibits a weight to area ratio of $\leq 1.0$ g/cm², the front and back surfaces comprised of a transparent glass material.

13. The thin glass envelope of claim 6, wherein the envelope exhibits a weight to area ratio of $\leq 1.0$ g/cm², preferably less than 0.5 g/cm².

14. A glass envelope exhibiting a weight to area ratio of $\leq 1.0$ g/cm², the envelope comprising a front surface and a back surface laminated and integrated together to form a unitary envelope body essentially free of sealant materials and having at least one channel formed between said surfaces.

15. The glass envelope of claim 14 where said front and back surfaces are comprised of glass sheets.

16. The glass envelope of claim 15 wherein said sheets are integrated prior to cooling.

17. The glass envelope of claim 14 comprising a plurality of channels.

* * * * *